(12) United States Patent
Kubo et al.

(10) Patent No.: US 11,094,939 B2
(45) Date of Patent: Aug. 17, 2021

(54) SULFUR-BASED ACTIVE MATERIAL

(71) Applicant: SUMITOMO RUBBER INDUSTRIES, LTD., Kobe (JP)

(72) Inventors: Tatsuya Kubo, Kobe (JP); Fumiya Chujo, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/825,851

(22) Filed: Mar. 20, 2020

(65) Prior Publication Data
US 2020/0313189 A1    Oct. 1, 2020

(30) Foreign Application Priority Data

Mar. 29, 2019  (JP) .............................. JP2019-068451
Dec. 19, 2019  (JP) .............................. JP2019-229491

(51) Int. Cl.
| | |
|---|---|
| *H01M 4/60* | (2006.01) |
| *C08K 3/04* | (2006.01) |
| *C08K 3/06* | (2006.01) |
| *C08K 5/01* | (2006.01) |
| *H01M 10/0525* | (2010.01) |
| *H01M 4/02* | (2006.01) |

(52) U.S. Cl.
CPC ............. *H01M 4/602* (2013.01); *C08K 3/04* (2013.01); *C08K 3/06* (2013.01); *C08K 5/01* (2013.01); *H01M 10/0525* (2013.01); *C08K 2201/001* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 4,582,756 A | 4/1986 | Niinuma et al. | |
| 2010/0120929 A1* | 5/2010 | Naito ................... | B01J 13/14 |
| | | | 521/57 |
| 2011/0200875 A1 | 8/2011 | Miyuki et al. | |
| 2013/0029222 A1* | 1/2013 | Niwa .................... | H01M 4/587 |
| | | | 429/211 |

(Continued)

FOREIGN PATENT DOCUMENTS

| | | |
|---|---|---|
| GB | 1044680 | 10/1966 |
| JP | 42-26524 | 12/1967 |

(Continued)

OTHER PUBLICATIONS

English machine translation of Noguchi et al. (JP H.11269311 A); accessed online from Espacenet, PDF pp. 1-8. (Year: 1999).*

(Continued)

*Primary Examiner* — Katie L. Hammer
(74) *Attorney, Agent, or Firm* — Birch, Stewart, Kolasch & Birch, LLP (57) ABSTRACT

The present invention provides a sulfur-based active material prepared using an inexpensive polymer material as a starting material and a method of preparing the sulfur-based active material. A non-aqueous electrolyte secondary battery such as a lithium-ion secondary battery provided with an electrode comprising the sulfur-based active material has a large charging and discharging capacity and an excellent cyclability.

17 Claims, 2 Drawing Sheets

(56) References Cited

U.S. PATENT DOCUMENTS

| | | | |
|---|---|---|---|
| 2013/0330619 A1* | 12/2013 | Archer | H01M 4/1399 |
| | | | 429/213 |
| 2015/0221935 A1* | 8/2015 | Zhou | H01M 4/76 |
| | | | 429/213 |
| 2016/0310924 A1* | 10/2016 | Nakatomi | H01M 4/0404 |
| 2018/0208686 A1* | 7/2018 | Pyun | C08F 12/08 |

FOREIGN PATENT DOCUMENTS

| | | | | |
|---|---|---|---|---|
| JP | 60-19033 A | 1/1985 | | |
| JP | 11269311 A * | 10/1999 | | |
| JP | 6370219 B2 | 8/2018 | | |
| WO | WO-2004072160 A1 * | 8/2004 | | B01J 13/22 |
| WO | WO 2010/044437 A1 | 4/2010 | | |
| WO | WO-2017107040 A1 * | 6/2017 | | H01M 50/431 |

OTHER PUBLICATIONS

Bibliographic data and English abstract for Noguchi et al. (JP H11269311 A); accessed online from Espacenet, one page PDF. (Year: 1999).*

* cited by examiner

SULFUR-BASED ACTIVE MATERIAL

TECHNICAL FIELD

The present invention relates to a sulfur-based active material which is used for an electrode for a non-aqueous electrolyte secondary battery and a non-aqueous electrolyte secondary battery comprising the electrode.

BACKGROUND OF THE INVENTION

WO 2010/044437 discloses a method of manufacturing a lithium-ion secondary battery having a positive electrode formed from a sulfur-based active material obtained by heat-treating a starting material comprising a mixture of polyacrylonitrile and sulfur.

SUMMARY OF THE INVENTION

However, it became clear that in the method described in WO 2010/044437, battery performances such as a charging and discharging capacity and cyclability are largely affected by a quality (especially a particle size) of a starting polyacrylonitrile powder. Therefore, a very expensive polyacrylonitrile starting powder having a specific quality must be used, and in addition, there arose a new problem that a sulfur-based active material obtained after baking must be pulverized and classified to give a specified particle size suitable for manufacture of an electrode.

An object of the present invention is to provide a sulfur-based active material prepared using an inexpensive polymer material as a starting material and a method of preparing the sulfur-based active material. A non-aqueous electrolyte secondary battery such as a lithium-ion secondary battery provided with an electrode comprising the sulfur-based active material assures easy manufacturing and has a large charging and discharging capacity and an excellent cyclability.

The present inventors have found that a non-aqueous electrolyte secondary battery which is inexpensive, assures easy manufacturing, and has a large charging and discharging capacity and excellent cyclability can be manufactured by using a sulfur-based active material prepared by baking a starting material comprising sulfur and particles composed of a shell which comprises a polymer including methacrylonitrile as a monomer component and contains hydrocarbon therein, and thus, have completed the present invention.

Namely, the present invention relates to:

[1] a sulfur-based active material prepared by baking a starting material comprising sulfur and particles composed of a shell which comprises a polymer including methacrylonitrile as a monomer component, and contains hydrocarbon therein,

[2] the sulfur-based active material according to the above [1], wherein the hydrocarbon is one or more hydrocarbons selected from the group consisting of isobutane, isopentane and isooctane,

[3] the sulfur-based active material according to the above [1] or [2], wherein a temperature for baking the starting material is from 250 to 550° C.,

[4] the sulfur-based active material according to any one of the above [1] to [3], wherein the starting material further comprises an electrically conductive additive,

[5] the sulfur-based active material according to the above [4], wherein the electrically conductive additive is an electrically conductive carbon material,

[6] an electrode for a non-aqueous electrolyte secondary battery, the electrode comprising the sulfur-based active material according to any one of the above [1] to [5],

[7] a non-aqueous electrolyte secondary battery comprising the electrode of the above [6], and

[8] a method of preparing a sulfur-based active material, the method comprising a step of baking a starting material comprising sulfur and particles composed of a shell which comprises a polymer including methacrylonitrile as a monomer component and contains hydrocarbon therein.

According to the present invention, it is possible to manufacture a non-aqueous electrolyte secondary battery which is inexpensive, assures easy manufacturing, and has a large charging and discharging capacity and excellent cyclability.

DETAILED DESCRIPTION

A process for manufacturing a non-aqueous electrolyte secondary battery including preparation of a sulfur-based active material according to one embodiment of the present invention is explained below in detail. However, the following description is an example for explaining the present invention, and is not intended to limit a technical range of the present invention within the range of the description. Herein, when a numerical range is shown using "to", it includes numerical values at both sides thereof.

<Preparation of Sulfur-Based Active Material>

The sulfur-based active material according to the embodiment of the present invention can be prepared by baking a starting material comprising sulfur and particles composed of a shell which comprises a polymer including methacrylonitrile as a monomer component and contains hydrocarbon therein. Further, in a baking step, a vulcanization accelerator and/or an electrically-conductive additive may be further blended to the starting material.

The polymer including methacrylonitrile as a monomer component may be a homopolymer of methacrylonitrile (polymethacrylonitrile) or may be a copolymer of methacrylonitrile with one or more monomer components other than methacrylonitrile.

Known (meth)acrylic monomers such as acrylonitrile, (meth)acrylic acids, (meth)acrylic esters and (meth)acrylamide can be used suitably as the monomer components other than methacrylonitrile. Among these, one or more monomer components selected from the group consisting of acrylonitrile and (meth)acrylic esters are preferable, one or more monomer components selected from the group consisting of acrylonitrile and methyl methacrylate are more preferable, and acrylonitrile and methyl methacrylate are further preferable. Herein, the term "(meth)acryl" stands for "acryl" or "methacryl".

Further, conjugated diene compounds such as butadiene and isoprene can also be used as the monomer components other than methacrylonitrile.

In the copolymer, a copolymerization ratio of methacrylonitrile is usually from 1 to 99%, preferably from 10 to 95%, more preferably from 20 to 90%, further preferably from 30 to 80%.

A weight-average molecular weight (Mw) of the polymer is preferably from 1,000 to 1,000,000, more preferably from 10,000 to 300,000. It is noted that the Mw can be calibrated with standard polystyrene based on measurement values determined with a gel permeation chromatography (GPC) (GPC-8000 series manufactured by Tosoh Corporation; detector: differential refractometer; column: TSKGEL SUPERMALTPORE HZ-M manufactured by Tosoh Corporation).

The embodiment of the present invention is characterized in that the particles (hereinafter may be referred to as "thermally expandable microcapsules") composed of a shell which comprises a polymer including methacrylonitrile as a monomer component and contains hydrocarbon therein are used. Such thermally expandable microcapsules can be prepared by a method described in patent publications such as JP 42-26524 B, JP 60-19033 A and JP 6370219 B. Concretely the microcapsules can be prepared by performing a step of preparing an aqueous dispersion comprising the monomer component exemplified above, hydrocarbon and a dispersion stabilizer to be used for maintaining the dispersion and a step of polymerizing the monomer.

Further, commercially available thermally expandable microcapsules such as brand name "EXPANCEL" manufactured by Japan Fillite Co., Ltd., brand name "Matsumoto microsphere" manufactured by Matsumoto Yushi-Seiyaku Co., Ltd., "DYFOAM" manufactured by KUREHA CORPORATION and "ADVANCELL" manufactured by Sekisui Chemical Co., Ltd. can also be used as such thermally expandable microcapsules.

A boiling point of the hydrocarbon is not limited particularly as far as it is a temperature equal to or lower than a softening point of the polymer. The boiling point is usually from −20° C. to 120° C., preferably from 0° C. to 100° C., more preferably from 20° C. to 80° C. Examples of the hydrocarbon include saturated or unsaturated aliphatic hydrocarbons having 2 to 10 carbon atoms; preferably saturated or unsaturated aliphatic hydrocarbons having 3 to 8 carbon atoms; more preferably butane, isobutane, isobutene, pentane, isopentane, neopentane, cyclopentane, hexane, neohexane, cyclohexane, heptane, octane and isooctane; further preferably isobutane, isopentane and isooctane. These hydrocarbons may be used alone or may be used in combination of two or more thereof.

A content of hydrocarbon in the thermally expandable microcapsules is preferably from 1 to 70% by mass, more preferably from 3 to 40% by mass, further preferably from 5 to 20% by mass.

An average particle size of the thermally expandable microcapsules is preferably from 0.1 to 1,000 μm, more preferably from 0.5 to 500 μm, further preferably from 1 to 100 μm.

The shell of the thermally expandable microcapsules may comprise a polymerization catalyst such as magnesium hydroxide and an initiator other than the polymer including methacrylonitrile as a monomer component. A content of the polymer including methacrylonitrile as a monomer component is preferably 80% by mass or more, more preferably 85% by mass or more, further preferably 90% by mass or more, particularly preferably 95% by mass or more based on 100% by mass of the shell of the thermally expandable microcapsules.

Powdery sulfur, insoluble sulfur and precipitated sulfur can be used as sulfur, but colloidal sulfur is preferable since sulfur is in a form of fine particles. The compounding amount of sulfur is preferably not less than 250 parts by mass, more preferably not less than 300 parts by mass based on 100 parts by mass of the thermally expandable microcapsules from the viewpoint of a charging and discharging capacity and cyclability. While there is no upper limit of the compounding amount of sulfur, the compounding amount is preferably not more than 1,500 parts by mass, more preferably not more than 1,000 parts by mass since if the amount exceeds 1,500 parts by mass, a charging and discharging capacity or cyclability is saturated, and the amount of not more than 1500 parts by mass is advantageous from the viewpoint of cost.

When compounding a vulcanization accelerator, its amount is preferably 3 parts by mass or more, more preferably 10 parts by mass or more based on 100 parts by mass of the thermally expandable microcapsules from the viewpoint of a charging and discharging capacity and cyclability. While there is no upper limit of the amount of the vulcanization accelerator, the amount is preferably not more than 250 parts by mass, more preferably not more than 50 parts by mass since if the ratio exceeds 250 parts by mass, a charging and discharging capacity or cyclability is saturated, and the amount of not more than 250 parts by mass is advantageous from the viewpoint of cost.

The electrically-conductive additive is not limited particularly, and electrically-conductive carbon materials such as vapor grown carbon fibers (Vapor Grown Carbon Fibers: VGCF), carbon powders, carbon black (CB), acetylene black (AB), KETJENBLACK (KB) and graphite can be used suitably. From the viewpoint of a capacity density, an input/output characteristic and electric conductivity, acetylene black (AB) or KETJENBLACK (KB) is preferable. These electrically-conductive additives may be used alone or may be used in combination of two or more thereof.

When compounding the electrically-conductive additive, its amount is preferably 1 part by mass or more, more preferably 3 parts by mass or more, further preferably 5 parts by mass or more based on 100 parts by mass of the thermally expandable microcapsules from the viewpoint of a charging and discharging capacity and cyclability. Meanwhile, the amount is preferably 50 parts by mass or less, more preferably 30 parts by mass or less. When the amount is more than 50 parts by mass, a ratio of a sulfur-containing structure in the sulfur-containing compound decreases relatively. Therefore, there is a tendency that an object of further improving a charging and discharging capacity and cyclability is hardly achieved.

Baking of the starting material comprising the above-mentioned components is performed while heating the starting material under a non-oxidizing atmosphere. The non-oxidizing atmosphere is an atmosphere substantially including no oxygen and is used to inhibit deterioration of ingredient components due to oxidation and excessive thermal decomposition. Specifically, the starting material is subjected to heating in a quartz tube filled with an inert gas such as a nitrogen gas or an argon gas under an inert gas atmosphere. A baking temperature is preferably 250° C. or higher, more preferably 300° C. or higher. When the baking temperature is lower than 250° C., there is a tendency that a sulfurization reaction is insufficient and a charging and discharging capacity of a target product becomes lower. Meanwhile, the baking temperature is preferably 550° C. or lower, more preferably 500° C. or lower, further preferably 450° C. or lower. When the baking temperature exceeds 550° C., decomposition of the starting compound increases, resulting in a decreased yield and a reduced charging and discharging capacity.

So-called unreacted sulfur such as sulfur resulting from cooling and precipitation of sulfur sublimated during the baking remains in sulfides obtained after the baking. Since sulfur is an insulator, it functions as an electric resistance in the electrode and may cause decrease of a battery performance. Since the unreacted sulfur becomes a factor for decreasing cyclability, it is necessary to remove the unreacted sulfur. The unreacted sulfur can be removed by a method such as a method of drying by heating under reduced pressure, a method of drying with hot air or a method of washing with a solvent.

The thus obtained sulfur-based active material is in the form of fine particles having a particle size of less than 10 μm in a median size, and therefore, can be used as it is for application on an electrode without further pulverization and classification.

In the case of a usual use of the thermally expandable microcapsules, hydrocarbon in hollow particles expands by heating, followed by expansion of the shell, and thus, the thermally expandable microcapsules function as a foaming agent. In the embodiment of the present invention, it is conjectured that the shell comprising a polymer including methacrylonitrile as a monomer component reacts with sulfur by heating, thereby hardening the shell, and thus, the shell cannot resist a pressure of the hydrocarbon expanding at a predetermined temperature and is crushed, resulting in pulverization to an extent that a pulverization step is not necessary after the baking.

As a total content of sulfur in the sulfur-based active material increases, cyclability of a non-aqueous electrolyte secondary battery tends to be enhanced, and therefore, the total content of sulfur in the sulfur-based active material, which is measured by an elemental analysis, is preferably 35% by mass or more, more preferably 40% by mass or more. Further, the total content of oxygen in the sulfur-based active material, which is measured by an elemental analysis, is preferably 3% by mass or more, more preferably 4% by mass or more.

The sulfur-based active material according to the embodiment of the present invention is characterized in that there are peaks at around 1,530 $cm^{-1}$, at around 1,320 $cm^{-1}$, at around 940 $cm^{-1}$, at around 470 $cm^{-1}$, at around 370 $cm^{-1}$, and at around 310 $cm^{-1}$ within a range of from 200 $cm^{-1}$ to 1,800 $cm^{-1}$, in a Raman spectrum. These peaks in a Raman shift are observed in the same peaks as in the case where a ratio of sulfur atoms to an acrylic resin is changed, and characterize the sulfur-based active material according to the embodiment of the present invention. Each of the peaks can exist substantially within an error range of ±8 $cm^{-1}$ with respect to each of the peaks. It is noted that the above-mentioned Raman shift is one measured using a RAMAN-touch manufactured by Nanophoton Corporation (an excitation wavelength Δ=532 nm, a grating: 1200 gr/mm, a resolution: 1.2 $cm^{-1}$).

When a sulfur and a polymer including methacrylonitrile as a monomer component are mixed and heated at the predetermined temperature, a ring-closing reaction occurs and sulfur is taken into the polymer to form a three-dimensionally crosslinked structure. Thus, the sulfur-based active material according to the embodiment of the present invention obtained in such way suppresses the elution to electrolyte solution during a charging and discharging cycle. Thus, cyclability of the non-aqueous electrolyte secondary battery using the sulfur-based active material on an electrode is enhanced.

<Configuration of Electrode>

The electrodes (positive electrode and negative electrode) for the non-aqueous electrolyte secondary battery according to the embodiment of the present invention can have the same structure as in general non-aqueous electrolyte storage batteries. For example, the electrodes for the non-aqueous electrolyte secondary battery according to the embodiment of the present invention can be produced by applying, to a current collector, an electrode slurry prepared by mixing the above-mentioned sulfur-based active material, a binder, an electrically conductive additive and a solvent. Further, the electrodes can be produced by another method of kneading a mixture of the sulfur-based active material, the electrically conductive additive and the binder with a mortar, a press or the like, forming the mixture into a film and applying the mixture in the form of film onto a current collector with a press or the like.

(Current Collector)

As for a current collector, those which have been used commonly on electrodes for lithium-ion secondary batteries may be used. Examples of the current collector include aluminum-based current collectors such as aluminum foils, aluminum meshes, punched aluminum sheets and aluminum expanded sheets; stainless-steel-based current collectors such as stainless-steel foils, stainless-steel meshes, punched stainless-steel sheets and stainless-steel expanded sheets; nickel-based current collectors such as foamed nickel and nickel nonwoven fabrics; copper-based current collectors such as copper foils, copper meshes, punched copper sheets and copper expanded sheets; titanium-based current collectors such as titanium foils and titanium meshes; and carbon-based current collectors such as carbon nonwoven fabrics and carbon woven fabrics. Among these, aluminum-based current collectors are preferable from the viewpoint of a mechanical strength, conductivity, a mass density, cost and the like.

There is particularly no limitation in a shape of the current collector, and for example, beaten substrates, three-dimensional substrates and the like can be used. When three-dimensional substrates (foamed metal, mesh, woven fabric, non-woven fabric, expanded substrate and the like) are used, even in the case of a binder lacking adhesion to the current collector, there is a tendency that an electrode having a high capacity density can be obtained and a high rate charging and discharging characteristic becomes satisfactory.

(Binder)

Known binders which are used on electrodes can be used as a binder, and from the viewpoint of affinity for water and reduction of environmental load, aqueous binders are suitably used. Examples of the aqueous binder include hydroxypropyl cellulose (HPC), carboxymethyl cellulose (CMC), polyvinyl alcohol (PVA), acrylic resins, styrene-butadiene rubber (SBR), water-soluble polyimide (PI), water-soluble polyamide-imide (PAI), methacrylic resins (PMA), polyethylene oxide (PEO), urethane and the like. One or more thereof can be used alone or can be used in combination.

(Electrically-Conductive Additive)

The above-mentioned electrically-conductive additives usable in manufacturing the sulfur-based active material can be used similarly as the electrically-conductive additive.

(Solvent)

A solvent (aqueous solvent) containing water is preferable and water is preferable as a solvent for dispersing solid components such as the sulfur-based active material, the binder and the electrically conductive additive in producing the electrode slurry. If an organic solvent other than water is used, there is a tendency that elution, from the sulfur-based active material, of a sulfur component contributing to a charging and discharging reaction occurs and a charging and discharging capacity of the battery decreases. Further, an aqueous solvent is preferable also from the viewpoint of reduction of environmental load. In addition, within a range of not impairing the effect of the present invention (for example, an amount of an organic solvent other than water is less than 20% by mass), a solvent mixing with water such as N-methyl-2-pyrrolidone (NMP), N,N-dimethylformaldehyde or lower alcohols may be mixed.

A content of the sulfur-based active material is preferably 85% by mass or more, more preferably 87% by mass or more, further preferably 90% by mass or more based on 100% by mas of the solid components (particularly the sulfur-based active material, the binder and the electrically conductive additive. hereinafter the same) in the electrode slurry. Further, an upper limit of the content of the sulfur-based active material is not restricted, and is preferably 99% by mass or less, more preferably 97% by mass or less, further preferably 95% by mass or less.

A content of the binder is preferably from 0.1 to 10.0% by mass, more preferably from 0.5 to 8.0% by mass, further preferably from 1.0 to 6.0% by mass, particularly preferably from 2.0 to 5.0% by mass based on 100% by mass of the solid components in the electrode slurry.

When compounding the electrically conductive additive to the electrode slurry, a content thereof is preferably from 0.1 to 10.0% by mass, more preferably from 0.5 to 8.0% by mass, further preferably from 1.0 to 6.0% by mass, particularly preferably from 2.0 to 5.0% by mass based on 100% by mas of the solid components in the electrode slurry.

(Electrode material)

When using the sulfur-based active material according to the embodiment of the present invention on a positive electrode, examples of a negative electrode material include known metallic lithium, carbon-based materials such as graphite, silicon-based materials such as a silicon thin film and SiO, tin alloy-based materials such as copper-tin and cobalt-tin and the like. In the case where a carbon-based material, a silicon-based material, a tin alloy-based material or the like that does not include lithium is used, short-circuiting between positive and negative electrodes, which results from production of dendrite, can be less likely to arise, and a long service life of the non-aqueous electrolyte secondary battery can be achieved. Among the above-mentioned negative electrode materials, silicon-based materials, which are high capacity negative electrode materials, are preferred, and a silicon thin film that can make a thickness of the electrode thinner and is advantageous in capacity per volume is more preferable.

However, in the case where a negative electrode material that does not include lithium is used in combination with the positive electrode according to the embodiment of the present invention, neither the positive electrode nor the negative electrode includes lithium and thus a pre-doping treatment, in which lithium is inserted into either one of the negative electrode or positive electrode, or into both of them, becomes necessary.

For a method of lithium pre-doping, a publicly known method can be used. For example, in the case where a negative electrode is doped with lithium, the following methods of inserting lithium can be given: an electrolytically-doping method, in which a half-cell is assembled using metallic lithium as the counter electrode and then doping lithium electrochemically; and an application pre-doping method, in which doping is done by a diffusion of lithium onto an electrode by applying a metallic lithium foil onto the electrode and then leaving the electrode with the metallic lithium foil applied as it is within an electrolytic solution. Moreover, in another case as well where the positive electrode is pre-doped with lithium, it is possible to utilize the aforementioned electrolytically-doping method.

When using the sulfur-based active material according to the embodiment of the present invention on a negative electrode, examples of a positive electrode material include lithium-transition metal composite oxides (particularly cobalt-based composite oxides, nickel-based composite oxides, manganese-based composite oxides, cobalt-nickel-manganese ternary composite oxides). Further, lithium transition metal phosphate having an olivine type crystal structure (particularly lithium iron phosphate, lithium manganese phosphate) and the like can also be used. In addition, in the case where a positive electrode produced using a lithium-containing transition metal-lithium composite oxide-based compound as an active material is used in combination with a negative electrode produced using the electrode slurry according to the embodiment of the present invention, a lithium pre-doping treatment is not always necessary since the positive electrode includes lithium.

<Electrolyte>

An electrolyte constituting a non-aqueous electrolyte secondary battery may be a liquid or solid having ionic conductivity, and the same electrolyte as one used on known non-aqueous electrolyte secondary batteries can be used. However, from the viewpoint of high output characteristics, it is possible to use those in which an alkali-metal salt serving as a supporting electrolyte is dissolved in an organic solvent.

Examples of an organic solvent include at least one selected from non-aqueous solvents such as ethylene carbonate, propylene carbonate, dimethyl carbonate, diethyl carbonate, ethyl methyl carbonate, dimethyl ether, γ-butyrolactone, and acetonitrile. Preferred as an organic solvent is ethylene carbonate, propylene carbonate or a solvent mixture thereof.

Examples of the supporting electrolyte include $LiPF_6$, $LiBF_4$, $LiAsF_6$, $LiCF_3SO_3$, $LiI$, $LiClO_4$ and the like, and $LiPF_6$ is preferred.

A concentration of the supporting electrolyte can be from about 0.5 mol/liter to 1.7 mol/liter. It is noted that the electrolyte is not limited to a liquid form. For example, in the case where the non-aqueous electrolyte secondary battery is a lithium polymer secondary battery, the electrolyte can be a solid form (for example, a form of polymer gel), an ionic liquid, a molten salt or the like.

In addition to the above-described positive electrode, negative electrode and electrolyte, the non-aqueous electrolyte secondary battery can be further equipped with the other members, such as separators, as well. A separator intervenes between the positive electrode and the negative electrode, thereby not only allowing the movements of ions between the both electrodes but also preventing the positive electrode and the negative electrode from internally short-circuiting one another. When the non-aqueous electrolyte secondary battery is a hermetically-closed type, a function of retaining the electrolytic solution is required for the separator.

As for a separator, it is preferable to use a thin-thickness and microporous or nonwoven-shaped film that is made of a material such as polyethylene, polypropylene, polyacrylonitrile, aramid, polyimide, cellulose, glass or the like.

A configuration of the non-aqueous electrolyte secondary battery according to the embodiment of the present invention is not limited particularly, and can be formed as a variety of configurations such as cylindrical types, laminated types, coin types, button types and the like.

The non-aqueous electrolyte secondary battery provided with the electrode according to the embodiment of the present invention has a high capacity and is excellent in cyclability, and therefore, can be used as power sources for electrical devices such as a smartphone, power tools, vehicles, UPS and the like.

EXAMPLE

The present invention is explained by means of Examples, but is not limited to the Examples.

Various chemicals used in Examples and Comparative Examples are shown below.

Particles 1: Particles obtained by incorporating isopentane into a shell comprising a methacrylonitrile-acrylonitrile-methyl methacrylate copolymer (thermally expandable microcapsule available from Japan Fillite Co., Ltd.)

Particles 2: Particles obtained by incorporating isopentane into a shell comprising an acrylonitrile-methyl methacrylate copolymer (thermally expandable microcapsule available from Japan Fillite Co., Ltd.)

Polymer 1: Acrylonitrile-butadiene copolymer Sulfur: Precipitated sulfur available from Tsurumi Chemical Industry Co., Ltd.

Electrically conductive additive: Acetylene black (Denka Black available from Denka Company Limited)

Example 1

(Preparation of Starting Material)

A starting material is obtained by compounding Particles 1 and sulfur according to a compounding formulation of Example 1 shown in Table 1 and cutting a mixture into small pieces using a cutter mill, followed by a baking step.

(Reaction Apparatus)

Figure 1:
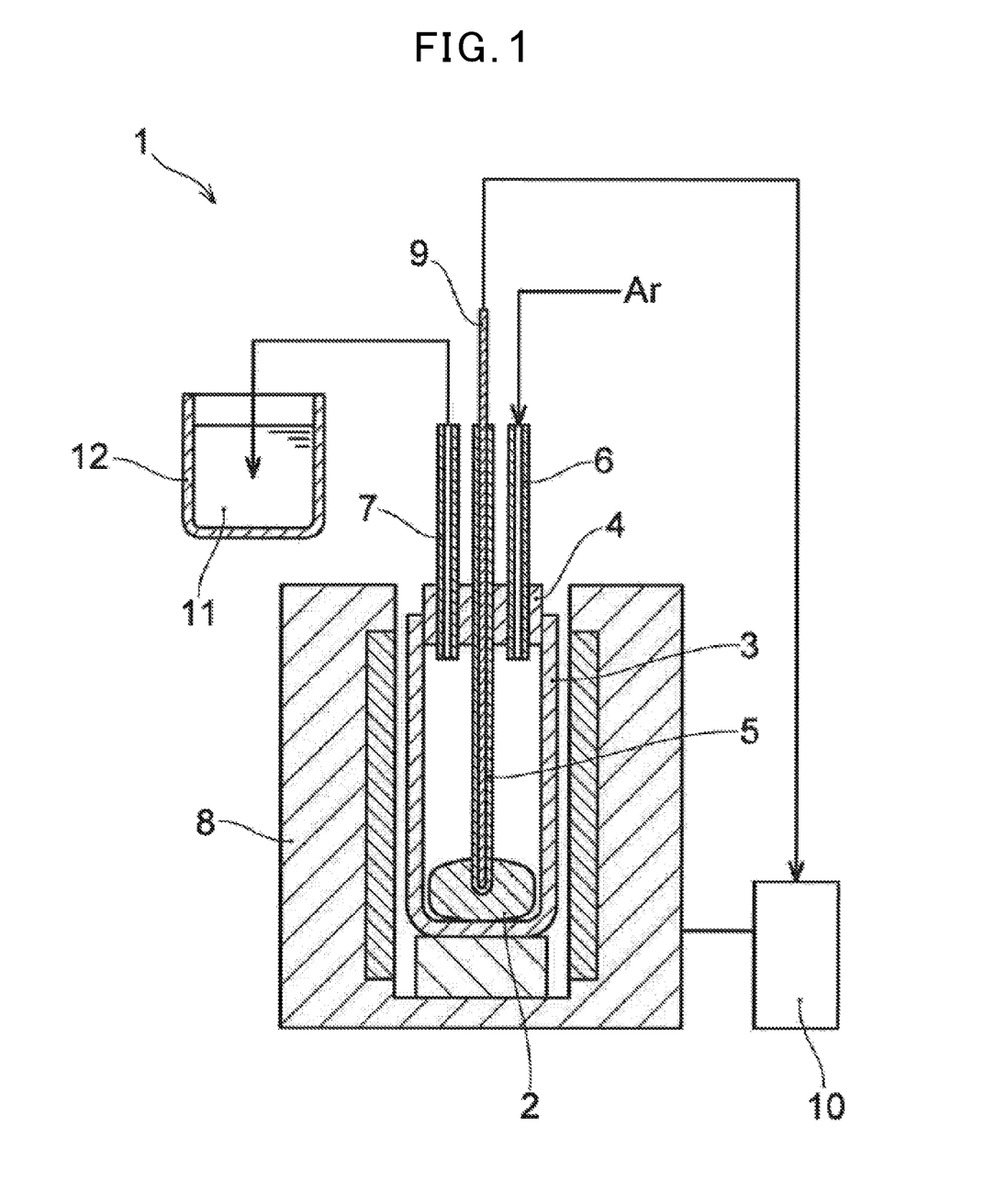
FIG. 1 is a sectional view schematically illustrating a reaction apparatus used for preparation of a sulfur-based active material.

A reaction apparatus 1 as illustrated in FIG. 1 was used for baking of the starting compound. The reaction apparatus 1 comprises a reaction container 3, which has an outer diameter of 60 mm, an inner diameter of 50 mm and a height of 300 mm and is made of quartz glass, that is formed as a bottomed cylindrical shape to contain and baking the starting compound 2; a silicone plug 4 for closing an upper opening of the reaction container 3; one alumina protection tube 5 ("Alumina SSA-S" available from NIKKATO CORPORATION, an outer diameter of 4 mm, an inner diameter of 2 mm and a length of 250 mm) and two tubes, which are a gas introducing tube 6 and a gas exhausting tube 7 (both are "Alumina SSA-S" available from NIKKATO CORPORATION, an outer diameter of 6 mm, an inner diameter of 4 mm and a length of 150 mm), these three tubes penetrating through the plug 4; and an electric furnace 8 (crucible furnace, width of an opening: 80 mm dia., heating height: 100 mm) for heating the reaction container 3 from the bottom side.

The alumina protection tube 5 is formed in such a length that the lower part below plug 4 reaches the starting compound 2 contained in the bottom of the reaction container 3 and a thermocouple 9 is inserted through the inside of the alumina protection tube 5. The alumina protection tube 5 is used as a protective tube for the thermocouple 9. The leading end of the thermocouple 9 is inserted into the starting compound 2 while being protected by the closed leading end of the alumina protection tube 5 and functions to measure a temperature of the starting compound 2. Output of the thermocouple 9 is input in a temperature controller 10 of the electric furnace 8 as shown by the solid arrow in the drawing and the temperature controller 10 functions to control a heating temperature of the electric furnace 8 based on the input from the thermocouple 9.

The gas introducing tube 6 and the gas exhausting tube 7 are formed such that the bottom end thereof projects in 3 mm downwardly from the plug 4.

The gas introducing tube 6 is continuously supplied with Ar gas from a gas supply system which is not shown. The gas exhausting tube 7 is connected to a trapping bath 12 containing an aqueous solution 11 of sodium hydroxide. The exhaust gas moving toward the outside through the gas exhausting tube 7 from the reaction container 3 is released to the outside after passing through the aqueous solution 11 of sodium hydroxide in the trapping bath 12. Therefore, even if hydrogen sulfide gas generated from a vulcanization reaction is included in the exhaust gas, the hydrogen sulfide gas is removed therefrom by being neutralized with the aqueous solution of sodium hydroxide.

(Baking Step)

In the baking step, heating with the electric furnace 8 was started 30 minutes after starting a continuous supply of Ar gas to the reaction container 3 holding the starting compound 2 in its bottom at a flow rate of 80 ml/min from the gas supply system. The temperature elevation rate was 150° C./hr. When the temperature of the starting compound reached 450° C., baking was conducted for two hours while maintaining the temperature of 450° C. Then, the starting compound 2 was cooled naturally under an Ar gas atmosphere to 25° C. while adjusting the flow rate of the Ar gas and a reaction product was taken out of the reaction container 3.

(Removal of Unreacted Sulfur)

In order to remove the unreacted sulfur (free elemental sulfur) remaining in the product after the baking step, the following step was carried out. Namely, the product was pulverized in a mortar and 2 g of a pulverized product was put in a glass tube oven and heated for three hours at 250° C. while vacuum suction was conducted to produce a sulfur-based active material in which unreacted sulfur was removed (or only a trace amount of unreacted sulfur was contained). The temperature elevation rate was 10° C./min.

(Raman Spectrum Analysis)

Figure 2:
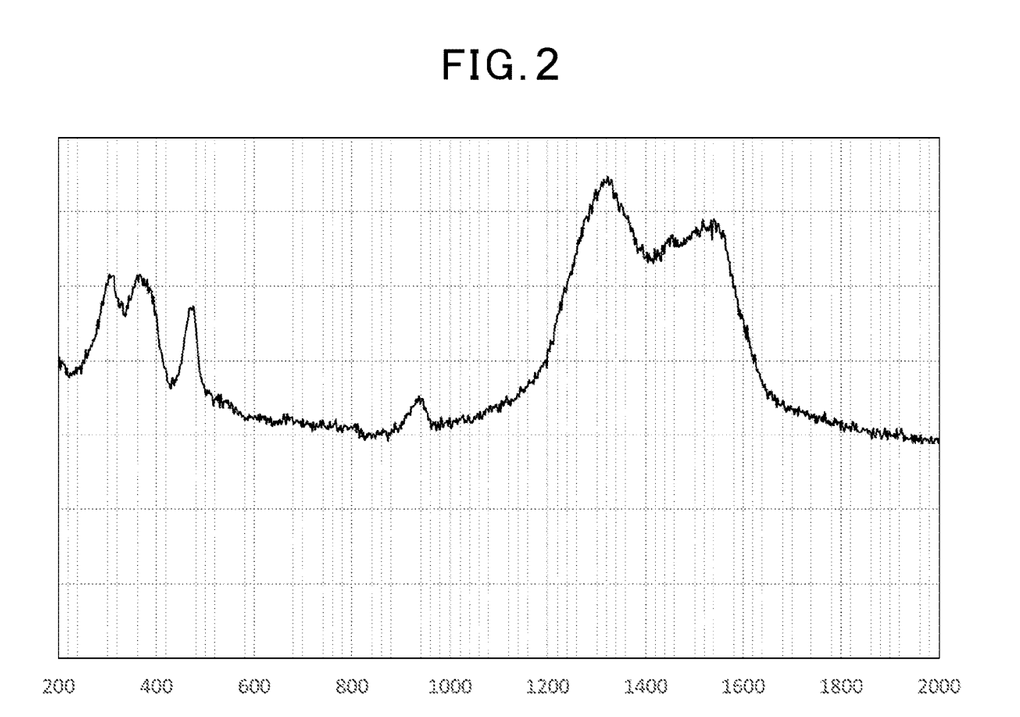
FIG. 2 is a graph showing a result of a Raman spectrum analysis of the sulfur-based active material obtained in Example 1.

With respect to an obtained sulfur-based active material, a Raman spectrum analysis was carried out using a RAMANtouch manufactured by Nanophoton Corporation under a condition of an excitation wavelength $\Delta=532$ nm, a grating: 1200 gr/mm, and a resolution: 1.2 cm$^{-1}$ (FIG. 2). FIG. 2 shows a relative strength in a vertical axis and a Raman shift (cm$^{-1}$) in a horizontal axis. In the obtained sulfur-based active material, peaks are observed at around 1,530 cm$^{-1}$, at around 1,320 cm$^{-1}$, at around 940 cm$^{-1}$, at around 470 cm$^{-1}$, at around 370 cm$^{-1}$, and at around 310 cm$^{-1}$ within a range of from 200 cm$^{-1}$ to 800 cm$^{-1}$ in a Raman shift.

<Elemental Analysis>

As for carbon, hydrogen and nitrogen, a mass ratio (%) based on a total amount of a sulfur-based active material was calculated from a mass amount measured with a full automatic elemental analysis device, vario MICRO cube manufactured by Elementar Analysensysteme GmbH. As for sulfur, a mass ratio (%) based on a total amount of a sulfur-based active material was calculated from a mass amount measured with an ion chromatograph device DX-320 manufactured by Dionex Corporation using a column (IonPac AS12A) manufactured by the same Corporation. For oxygen, a mass ratio (%) was calculated by an inert gas impulse heat dissolution NDIR method using EMGA-920 manufactured by Horiba, Ltd.

<Preparation of Lithium-Ion Secondary Battery>
[1] Positive Electrode

The sulfur-based active material as produced above, an electrically conductive additive and an aqueous acrylic resin were measured so that the compounding ratio thereof became 90:5:5 (mass ratio), and were put into a container. By using Milli-Q ultra pure water as a dispersant, a mixture was subjected to stirring and mixing with a rotation/revolution mixer (ARE-250 available from Thinky Corporation) to prepare a uniform slurry. The prepared slurry was applied onto a 20 μm thick aluminum foil with an applicator having a slit width of 60 μm, followed by compression with a roll press and then 3-hour heating at 120° C. with a dryer. After the drying, an obtained foil was punched into a disc of 11 mm diameter to obtain a positive electrode for a lithium-ion secondary battery. Thereafter, a weight of the positive electrode was measured, and a mass ratio of the active material in the electrode was calculated from the above-mentioned ratio.

[2] Negative Electrode

A metallic lithium foil (manufactured by Honjo Metal Co., Ltd.) having a thickness of 500 μm and punched out to a circle with 14 mm in diameter was used as a negative electrode.

[3] Electrolyte

A non-aqueous electrolyte in which $LiPF_6$ had been dissolved in a mixed solvent of ethylene carbonate and diethyl carbonate was used as an electrolyte. A volume ratio of ethylene carbonate and diethyl carbonate was 1:1. A concentration of $LiPF_6$ in the electrolyte was 1.0 mol/liter.

[4] Battery

Using the positive electrode and negative electrode obtained in the above [1] and [2], a coin-type battery was prepared. Specifically, in a dry room, a separator (Celgard 2400 manufactured by Celgard, a polypropylene microporous film with a thickness of 25 μm) and a glass nonwoven filter (GA100 manufactured by ADVANTEC CO., LTD. and having a thickness of 440 μm) were sandwiched between the positive electrode and the negative electrode to form an electrode-assembly battery. This electrode-assembly battery was accommodated in a battery case (a member for CR2032-type coin battery, a product of HOSEN Co., Ltd.) made of a stainless-steel container and the electrolyte solution prepared in the above [3] was added to the battery case. The battery case was sealed hermetically with a crimping machine, thereby obtaining a coin-type lithium-ion secondary battery of Example 1.

Example 2

A battery was produced in the same manner as in Example 1 except that an electrically conductive additive was further blended to a starting material.

Comparative Example 1

A battery was produced in the same manner as in Example 1 except that Particles 2 was used instead of Particles 1. A step of finely pulverizing a baked product in a mortar was added.

Comparative Example 2

A battery was produced in the same manner as in Example 1 except that a powder of Polymer 1 was used instead of Particles 1. A step of finely pulverizing a baked product in a mortar was added.

[Test Method]
<Measuring Test of Charging and Discharging Capacity>

With respect to each coin-type lithium-ion secondary battery prepared in Examples and Comparative Examples, charging and discharging were carried out at an electric-current value equivalent to 50 mA per 1 g of the sulfur-based active material under a condition of a test temperature of 30° C. The discharge termination voltage was 1.0 V and the charging termination voltage was 3.0 V. Charging and discharging was repeated 30 times. Each discharging capacity (mAh/g) was measured and a discharging capacity (mAh/g) at the second discharging was regarded as an initial capacity. The results are shown in Table 1. The larger the initial capacity is, the larger the charging and discharging capacity of the lithium-ion secondary battery is, which is evaluated as preferable.

Moreover, from a discharging capacity $DC_{10}$ (mAh/g) at the tenth discharging and a discharging capacity $DC_{30}$ (mAh/g) at the thirtieth discharging, a capacity retention rate (%) was calculated by the following formula. The results are shown in Table 1. It can be said that the higher the capacity retention rate is, the more excellent cyclability of the lithium-ion secondary battery is.

Capacity retention rate (%)=$(DC_{30}(mAh/g)/DC_{10}(mAh/g))\times 100$

TABLE 1

| | Example | | Comparative Example | |
|---|---|---|---|---|
| | 1 | 2 | 1 | 2 |
| Positive electrode active material | | | | |
| Formulation (part by mass) | | | | |
| Particles 1 | 100 | 100 | — | — |
| Particles 2 | — | — | 100 | — |
| Polymer 1 | — | — | — | 100 |
| Sulfur | 500 | 500 | 500 | 500 |
| Electrically conductive additive | — | 10 | — | — |
| Elemental analysis (%) | | | | |
| C | 35.6 | 40.1 | 48.2 | 41.6 |
| H | 0.8 | 0.6 | 1.9 | 0.2 |
| N | 12.4 | 11.3 | 12.6 | 4.2 |
| S | 47.5 | 43.1 | 26.2 | 53.8 |
| O | 5.4 | 5.0 | 12.0 | 0.2 |
| Pulverization step after baking | Not performed | Not performed | Performed | Performed |
| Evaluation of battery | | | | |
| Discharging capacity (mAh/g) | | | | |
| First time | 849 | 843 | 427 | 522 |
| Second time | 639 | 653 | 242 | 267 |
| Tenth time | 616 | 619 | 233 | 241 |
| Thirtieth time | 585 | 589 | 227 | 216 |
| Capacity retention rate (%) | 95.0 | 95.2 | 97.4 | 89.6 |

From the results of Table 1, it is seen that the lithium-ion secondary battery is produced using, as an electrode material, the sulfur-based active material of the present invention prepared by baking a starting material comprising sulfur and particles composed of a shell which comprises a polymer including methacrylonitrile as a monomer component and contains hydrocarbon therein, and has excellent charging and discharging capacity and cyclability.

INDUSTRIAL APPLICABILITY

A non-aqueous electrolyte secondary battery which is inexpensive, assures easy manufacturing, and has a large charging and discharging capacity and excellent cyclability can be manufactured by using a sulfur-based active material of the present invention as an electrode material.

EXPLANATION OF SYMBOLS

1 Reaction apparatus
2 Starting compound
3 Reaction container
4 Silicone plug
5 Alumina protection tube
6 Gas introducing tube
7 Gas exhausting tube
8 Electric furnace
9 Thermocouple
10 Temperature controller
11 Aqueous solution of sodium hydroxide
12 Trapping bath

What is claimed is:

1. A sulfur-based active material in the form of fine particles prepared by baking a starting material comprising:
    elemental sulfur, and
    thermally expandable microcapsules that have a shell which comprises a polymer including methacrylonitrile as a monomer component and contain hydrocarbon therein,
    wherein the total content of sulfur in the sulfur-based active material is 40% by mass or more as measured by elemental analysis.

2. The sulfur-based active material of claim 1, wherein the hydrocarbon is one or more hydrocarbons selected from the group consisting of isobutane, isopentane and isooctane.

3. The sulfur-based active material of claim 1, wherein a temperature for baking the starting material is from 250 to 550° C.

4. The sulfur-based active material of claim 1, wherein the starting material further comprises an electrically conductive additive.

5. The sulfur-based active material of claim 4, wherein the electrically conductive additive is an electrically conductive carbon material.

6. An electrode for a non-aqueous electrolyte secondary battery, the electrode comprising the sulfur-based active material of claim 1.

7. A non-aqueous electrolyte secondary battery comprising the electrode of claim 6.

8. A method of preparing a sulfur-based active material in the form of fine particles, the method comprising a step of baking a starting material comprising:
    elemental sulfur, and
    thermally expandable microcapsules that have a shell which comprises a polymer including methacrylonitrile as a monomer component and contain hydrocarbon therein,
    wherein the sulfur is present in an amount of not less than 250 parts by mass based on 100 parts by mass of the thermally expandable microcapsules.

9. The sulfur-based active material of claim 1, wherein the sulfur is present in an amount of not less than 250 parts by mass based on 100 parts by mass of the thermally expandable microcapsules.

10. The sulfur-based active material of claim 1, wherein a median particle size of the sulfur-based active material is less than 10 μm.

11. The sulfur-based active material of claim 1, wherein the thermally expandable microcapsules have an average particle size of 0.5 to 500 μm.

12. The sulfur-based active material of claim 1, wherein the content of hydrocarbon included in the thermally expandable microcapsules in 1 to 70% by mass.

13. The sulfur-based active material of claim 1, wherein the hydrocarbon is a saturated or unsaturated aliphatic having 2 to 10 carbon atoms and having a boiling point of −20° C. to 120° C.

14. The method of preparing a sulfur-based active material of claim 8, wherein the temperature of the baking step is between 250° C. and 550° C.

15. The method of preparing a sulfur-based active material of claim 8, wherein the thermally expandable microcapsules have an average particle size of 0.5 to 500 μm.

16. The method of preparing a sulfur-based active material of claim 8, wherein the content of hydrocarbon included in the thermally expandable microcapsules in 1 to 70% by mass.

17. The method of preparing a sulfur-based active material of claim 8, wherein the hydrocarbon is a saturated or unsaturated aliphatic having 2 to 10 carbon atoms and having a boiling point of −20° C. to 120° C.

* * * * *